United States Patent Office 3,591,323
Patented July 6, 1971

3,591,323
NEW HAIR DYEING SOLUTION
Gregoire Kalopissis, Paris, and Andree Bugaut, Boulogne-sur-Seine, France, assignors to L'Oreal, Paris, France
No Drawing. Filed Feb. 7, 1966, Ser. No. 525,291
Claims priority, application France, May 6, 1965, 16,140
Int. Cl. A61k 7/12
U.S. Cl. 8—11
17 Claims

ABSTRACT OF THE DISCLOSURE

A composition for dyeing keratinic fibers comprising effective amounts of aromatic paradiamine of the formula

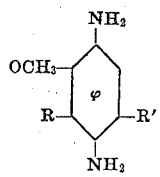

in which R and R' each represent a substance selected from the group consisting of hydrogen and methyl, but R' must be methyl when R is methyl, and meta-amino-phenol which serves as a coupling substance of the formula

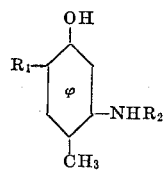

in which $R_1$ represents a substance selected from the group consisting of chlorine and hydrogen and $R_2$ represents a substance selected from the group consisting of hydrogen, carbamylmethyl and diethyl carbamylmethyl, but $R_1$ must be chlorine when $R_2$ is hydrogen, and the method of dyeing hair with this composition.

---

Hair dyes having a substituted or unsubstituted aromatic diamine base have been used for a long time. The substitutions are carried by the aromatic ring or the nitrogen atoms of the amino groups. Coupling substances are added to these diamines to vary the color obtained.

It is also known that the addition of certain coupling substances to such aromatic paradiamines makes it possible to obtain particularly stable and long-lasting colorations, whereas the shades obtained with the bases alone change rapidly. Moreover, certain of these bases are not dyes in themselves, but are effective only when suitably coupled.

Among the known substances conventionally coupled with aromatic paradiamines is meta-amino-phenol, which unfortunately frequently produces hair dyes which do not last very long. The present invention proposes a new class of meta-amino-phenols for use as coupling substances, which make it possible to obtain especially stable long-lasting colorations, which resist exposure to the light and to outside agents, and enlarge the range of shades in the blue section of the spectrum which may be obtained by associating an aromatic paradiamine and a meta-amino-phenol.

The object of the present invention is to provide a new dye for keratinic fibers, and particularly for hair, essentially characterized by the fact that it comprises, on the one hand, at least one aromatic paradiamine having the formula:

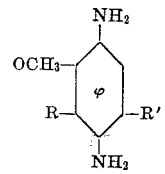

in which R and R' represent hydrogen or a methyl radical, but R' cannot be hydrogen when R is a methyl radical, and at least one meta-amino-phenol serving as a coupling substance and having the following formula:

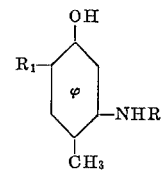

in which $R_1$ is chlorine or hydrogen and $R_2$ represents hydrogen, a carbamylmethyl radical, or a diethyl carbamylmethyl radical, but $R_1$ may be chlorine only when $R_2$ is hydrogen.

The present invention is also directed to the new chemical compound having the formula:

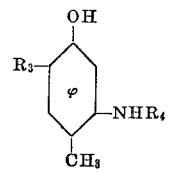

in which $R_3$ represents chlorine and $R_4$ hydrogen, or $R_3$ represents hydrogen and $R_4$ a carbamylmethyl or diethylcarbamylmethyl radical.

A characteristic feature of the invention resides in the fact that in the dyeing solution the ratio between the molecular concentration of the bases used and that of the coupling substances used is generally close to, but preferably less than 1.

The said dyeing solution is utilized in a conventional manner, by bringing it to an alkaline pH, with ammonia, for example, and applying it to the hair in the presence of an oxidizing solution, and preferably a hydrogen peroxide solution.

The dyeing solution may also contain other dyes which may be used under the same conditions as direct dyes for keratinic fibers, for example azo or anthraquinone dyes, or dyes obtained by associating bases and coupling substances other than those with which the present invention is concerned.

The dyeing solutions may also contain wetting, dispersing, or penterating agents, and other ingredients commonly included in hair dyes. The product may take the form of an aqueous solution, a cream or a gel.

A very broad range of colors within the blue portion of the spectrum may be obtained by associating a coupling substance according to the invention with an aromatic paradiamine, and when an aromatic paradiamine is used with a combination of two coupling substances according to the invention all the shades between those which can be obtained by associating any of the single coupling substances with the base may be secured by varying the proportion between the two coupling substances.

Another object of the invention is the new method of dyeing the hair which comprises the steps of adding hydrogen peroxide, applying a dye of the above-defined type, and then rinsing, shampooing, washing and drying the hair.

EXAMPLE 4

Preparation of 2-amino-4-hydroxy-5-chlorotoluene

This process embodies the reaction shown in the following diagram:

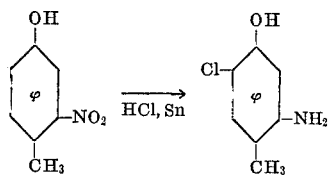

0.5 mol (76.5 g.) of 2-nitro-4-hydroxy toluene is reduced with a mixture of tin and concentrated hydrochloric acid. This is filtered while hot, yielding 45 g. of 2-amino-4-hydroxy-5-chloro toluene hydrochloride, which is insoluble in concentrated hot hydrochloric acid. The hydrochloric solution of the reduction contains 2-amino-4-hydroxy toluene as chlorostannate. 2-amino-4-hydroxy toluene, which melts at 159° C., may be isolated, if desired.

The hydrochloride thus obtained is dissolved in water. The solution is alkalized with ammonia and drying yields 33.8 g. of 2-amino-4-hydroxy-5-chloro toluene, which after recrystallization in benzene, melts at 144.5° C.

*Analysis.*—Calculated for $C_7H_6ONCl$ (percent): C, 53.33; H, 5.07; N, 8.88. Found (percent): C, 53.33–53.60; H, 5.08–5.02; N, 9.07–9.03.

EXAMPLE 5

The following solution is prepared:

2-amino-4-hydroxy-5-chloro toluene—0.32 g.
2,5-diamino-4-methyl-1-methoxy benzene dihydrochloride—0.45 g.
Ammonium lauryl sulfate (having 20% fatty alcohol)—10.00 g.
Ammonia (at 20%)—7 cm.³
Water, q.s.p. 100 g.

This solution is mixed with an equal weight of hydrogen peroxide at 20 volumes, and applied to white hair. After 20 minutes, the hair is shampooed, rinsed and dried. An intense violet shade results.

EXAMPLE 6

The following solution is prepared:

1-hydroxy-4-methyl-5-carbamylmethylamino benzene—0.36 g.
2,5-diamino-4-methyl-1-methoxy benzene dihydrochloride—0.39 g.
Ammonium lauryl sulfate (having 20% fatty alcohol)—10.00 g.
Ammonia at 20%—7 cm.³
Water, q.s.p. 100 g.

This solution is mixed with an equal weight of hydrogen peroxide at 20 volumes and applied to white hair. After 20 minutes, the hair is shampooed, rinsed, and dried. An intense, slightly violet, blue results.

EXAMPLE 7

The following solution is prepared:

2-amino-4-hydroxy toluene—1.2 g.
Paradiaminoanisol sulfate—1.4 g.
Ammonia at 20%—10 cm.³
Alcohol at 95°—10 cm.³
Water, q.s.p. 100 cm.³

This solution is mixed with an equal volume of hydrogen peroxide at 20 volumes, and applied to 100% white hair. After 20 minutes, the hair is shampooed, washed, and dried. A strong marine blue shade, which is stable when exposed to the light, results.

EXAMPLE 8

The following solution was prepared:

2-amino-4-hydroxy-5-chloro toluene—1.5 g.
3,6-diamino-2,4-dimethyl anisol dihydrochloride—2.2 g.
Ammonia at 20%—10 cm.³
Alcohol at 95°—10 cm.³
Water, q.s.p. 100 cm.³

This solution is mixed with an equal volume of hydrogen peroxide at 20 volumes. The mixture is applied to 100% white hair. After 20 minutes the hair is shampooed, rinsed, and dried. An intense bluish violet shade, which is stable when exposed to the light, results.

EXAMPLE 9

The following solution is prepared:

2-carbomylmethylamino,4-hydroxy toluene—1.8 g.
2,5-diamino-4-methyl anisol dihydrochloride—2.2 g.
Ammonia at 20%—10 cm.³
Alcohol at 95°—10 cm.³
Water, q.s.p.—100 cm.³

This solution is mixed with an equal volume of hydrogen peroxide at 20 volumes. The mixture is applied to 50% white hair. After 20 minutes of application the hair is shampooed, rinsed and dried. A deep blue-black shade, which is stable when exposed to the light, results.

EXAMPLE 10

The following solution is prepared:

2-carbamylmethylamino-4-hydroxy toluene—1.8 g.
Para-aminodiphenylamine—1.8 g.
Ammonia at 20%—10 cm.³
Alcohol at 95°—10 cm.³
Water, q.s.p.—100 cm.³

This solution is mixed with an equal volume of hydrogen peroxide at 20 volumes and applied to 80% white hair. After 30 minutes the hair is shampooed, rinsed and dried. A clear rosy chestnut shade, which is stable when exposed to the light, is obtained.

EXAMPLE 11

The following solution is prepared:

3,6-diamino-2,4-dimethyl anisol dihydrochloride—16.6 g.
2-amino-4-hydroxy-5-chlorotoluene—15.75 g.
Ammonium lauryl sulfate at 20%—200 g.
Carboxymethylcellulose—20 g.
Sodium bisulfite—4 g.
Ethylene diamino tetra-acetic acid—3 g.
Ammonia at 20%—100 cm.³
Water, q.s.p.—1000 g.

This mixture is a thick liquid. It is diluted, when used, with an equal volume of hydrogen peroxide and applied to 90% white hair. After 30 minutes the hair is rinsed, shampooed, and dried. An intense violine shade, which is stable when exposed to the light, results.

EXAMPLE 12

The following solution is prepared:

3,6-diamino-2,4-dimethyl anisol dihydrochloride—16.6 g.
2-amino-4-hydroxy toluene—12.3 g.
Ammonium lauryl sulfate at 20%—200 g.
Carboxymethylcellulose—20 g.
Ethylene diamino tetra-acetic acid—3 g.
Sodium bisulfite—4 g.
Ammonia at 20%—100 cm.³
Water, q.s.p.—1000 g.

The solution is a thick liquid. It is mixed with an equal volume of hydrogen peroxide at 20 volumes and applied to 90% white hair. After 30 minutes, the hair is rinsed, shampooed and dried. The result is a periwinkle violet color, which is stable when exposed to the light.

EXAMPLE 13

The following solution is prepared:

3,6-diamino-2,4-dimethyl anisol dihydrochloride—8.3 g.
2-amino-4-hydroxy-5-chloro toluene—7.8 g.
Ammonium lauryl sulfate at 20%—200 g.
Carboxymethylcellulose—20 g.
Disodium salt of ethylene diamino tetraacetic acid (Trilon B)—3 g.
Sodium bisulfite—4 g.
Ammonia at 20%—100 cm.³
Water, q.s.p.—1000 g.

This solution is mixed with an equal volume of hydrogenperoxide at 20 volumes and applied to 90% white hair. After wating 30 minutes the hair is rinsed, shampooed and dried. The result is a mahogany violine shade, which is stable when exposed to the light.

EXAMPLE 14

The following solution is prepared:

3,6-diamino-2,4-dimthyl anisol dihydrochloride—16.6 g.
2-amino-4-hydroxy toluene—12.3 g.
1-amino-2-nitro-4-N-methylamino benzene—1.5 g.
Ammonium lauryl sulfate—200 g.
Carboxymethylcellulose—20 g.
Disodium salt of ethylene diamino tetraacetic acid (Trilon B)—3 g.
Sodium bisulfite—4 g.
Ammonia at 20%—100 cm.³
Water, q.s.p.—1000 g.

This solution is mixed with an equal volume of hydrogen peroxide and applied to 90% white hair. After waiting 30 minutes, the haired is rinsed, shampooed and dried. A deep violet shade, which is stable when exposed to the light, results.

EXAMPLE 15

The following solution is prepared:

Paradiamino anisol sulfate—13.8 g.
2-carbamylmethylamino-4-hydroxy toluene—18 g.
1-amino - 2 - nitro - 4 - amino aminoethyl benzene sulfate—2 g.
Ammonium lauryl sulfate at 20%—200 g.
Carboxymethylcellulose—10 g.
Disodium salt of ethylene diamino tetraacetic acid (Trilon B)—3 g.
Sodium bisulfite—4 g.
Ammonia at 20%—100 cm.³
Water, q.s.p.—1000 g.

This solution is mixed with an equal volume of hydrogen peroxide at 20 volumes and applied to 90% white hair. After waiting 30 minutes the hair is rinsed, shampooed and dried. The result is a mahogany violine shade, which is stable when exposed to the light.

EXAMPLE 16

The following solution is prepared:

Paradiamino-anisol sulfate—13.8 g.
2-(diethylcarbamyl) - methylamino - 4 - hydroxytoluene—18 g.
1-amino-2-nitro-4-amino-ethylamine benzene sulfate—2 g.
Ammonium lauryl sulfate at 20%—200 g.
Carboxymethyl cellulose—10 g.
Disodium salt of ethylene diamino tetraacetic acid (Trilon B)—3 g.
Sodium bisulfite—4 g.
Ammonia at 20%—100 cm.³
Water, q.s.p.—1000 g.

This solution is mixed with an equal volume of hydrogen peroxide at 20 volumes and applied to 90% white hair. The result is a blue-black shade which is stable when exposed to the light.

It will be appreciated that the methods of carrying out the invention which have just been described have been given purely by way of example and that the scope of the invention should not be considered to be limited to the specific methods described.

In particular, it is obvious that the invention is not limited to the concept of applying to the hair a dye containing simultaneously one or more of the bases, one or more of the coupling substances and hydrogen peroxide, but that a plurality of solutions, each containing only one or more of the various ingredients may be successively applied to the hair.

What is claimed is:

1. An aqueous composition for dyeing keratinic fibers comprising a dyeing amount of (1) an aromatic paradiamine having the formula

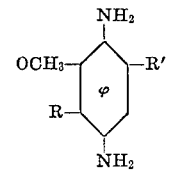

in which R and R' are selected from the group consisting of hydrogen and methyl, but R' must be methyl when R is methyl, and (2) meta-amino-phenol which serves as a coupling substance having the formula

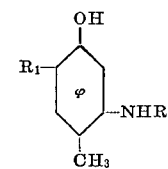

in which $R_1$ represents a substance selected from the group consisting of chlorine and hydrogen and $R_2$ represents a substance selected from the group consisting of hydrogen, carbamylmethyl, and diethyl carbamylmethyl, but $R_1$ is chlorine only when $R_2$ is hydrogen wherein the molar ratio of the aromatic paradiamine to said meta-amino-phenol is about 1 to 1.

2. The composition of claim 1 having a pH between 7 and 12.

3. The composition of claim 1 having a pH between 8 anl 10.

4. The composition of claim 1, wherein said paradiamine is 2,5-diamino-4-methyl-1-methoxy benzene dihydrochloride and said meta-amino-phenol is 2-amino-4-hydroxy-5-chlorotoluene.

5. The composition of claim 1, wherein said paradiamine is 2,5-diamino-4-methyl-1-methoxy benzene dihydrochloride and said meta-amino-phenol is 1-hydroxy-4-methyl-5-carbamylmethylamino benzene.

6. The composition of claim 1, wherein said paradiamine is paradiaminoanisol sulfate and said meta-aminophenol is 2-amino-4-hydroxy toluene.

7. The composition of claim 1, wherein said paradiamine is 3,6-diamino-2,4-dimethyl-anisol dihydrochloride and said meta-amino-phenol is 2-amino-4-hydroxy-5-chlorotoluene.

8. The composition of claim 1, wherein said paradiamine is 2,5-diamino-4-methyl anisol dihydrochloride and said meta-amino-phenol is 2-carbamyl-methylamino-4-hydroxy toluene.

9. The composition of claim 1, wherein said paradiamine is para-aminodiphenolamine and said meta-aminophenol is 2-carbamylmethylamino-4-hydroxy toluene.

10. The composition of claim 1, wherein said paradiamine is 3,6-diamino-2,4-dimethyl anisol dihydrochloride and said meta-amino-phenol is 2-amino-4-hydroxy toluene.

11. The composition of claim 1, wherein said paradiamine is paradiamino anisol sulfate and said meta-aminophenol is 2-carbamylmethylamino-4-hydroxy toluene.

12. The composition of claim 1, wherein said paradiamine is paradiamino-anisol sulfate and said meta-aminophenol is 2-(diethylcarbamyl)-1-methylamino-4-hydroxytoluene.

13. A method of dyeing hair which comprises the steps of applying a dyeing amount of the composition of claim 1 to the hair, and then rinsing, shampooing and drying the hair.

14. The method of claim 13 wherein said composition is mixed with an oxidizing agent just before being applied to the hair.

15. The method of claim 14 wherein said oxidizing agent is hydrogen peroxide.

16. The method of dyeing the hair which comprises the steps of applying separately thereto a dyeing amount of an aqueous composition containing
an aromatic paradiamine having the formula

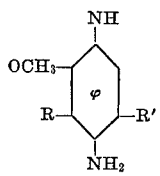

in which R and R' are selected from the group consisting of hydrogen and methyl, but R' must be methyl when R is methyl, and a composition containing
meta-amino-phenol which serves as a coupling substance having the formula

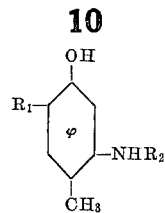

in which $R_1$ represents a substance selected from the group consisting of chlorine and hydrogen and $R_2$ represents a substance selected from the group consisting of hydrogen, carbamylmethyl, and diethylcarbamylmethyl, but $R_1$ is chlorine only when $R_2$ is hydrogen and wherein the molar ratio of the aromatic paradiamine to said meta-amino-phenol is about 1 to 1.

17. The method of claim 16 with the step of applying a conventional oxidizing agent to the hair.

References Cited
UNITED STATES PATENTS 3,210,252   10/1965   Blanke et al. _____ 167—88

FOREIGN PATENTS 983,207   2/1965   Great Britain _____ 167—88
Ad. 14,113   7/1911   France _____ 8—11
(1st addition to No. 413,877)
1,145,746   3/1963   Germany _____ 167—88

ALBERT T. MEYERS, Primary Examiner
L. SCHENKMAN, Assistant Examiner

U.S. Cl. X.R.

8—10.2, 25, 26; 260—559, 575

UNITED STATES PATENT OFFICE
CERTIFICATE OF CORRECTION

Patent No. 3,591,323                    Dated July 6, 1971

Inventor(s) Gregoire Kalopissis and Andree Bugaut

It is certified that error appears in the above-identified patent and that said Letters Patent are hereby corrected as shown below:

At Col. 1, between lines 15 and 24; Col. 2, between lines 2 and 10; Col. 8, between lines 15 - 24 (Claim 1); and Col. 9, between lines 17 - 29 (Claim 16), change the structural formula to read:

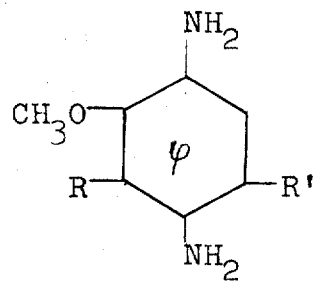

Signed and sealed this 7th day of March 1972.

(SEAL)
Attest:

EDWARD M. FLETCHER, JR.
Attesting Officer

ROBERT GOTTSCHALK
Commissioner of Patents